UNITED STATES PATENT OFFICE.

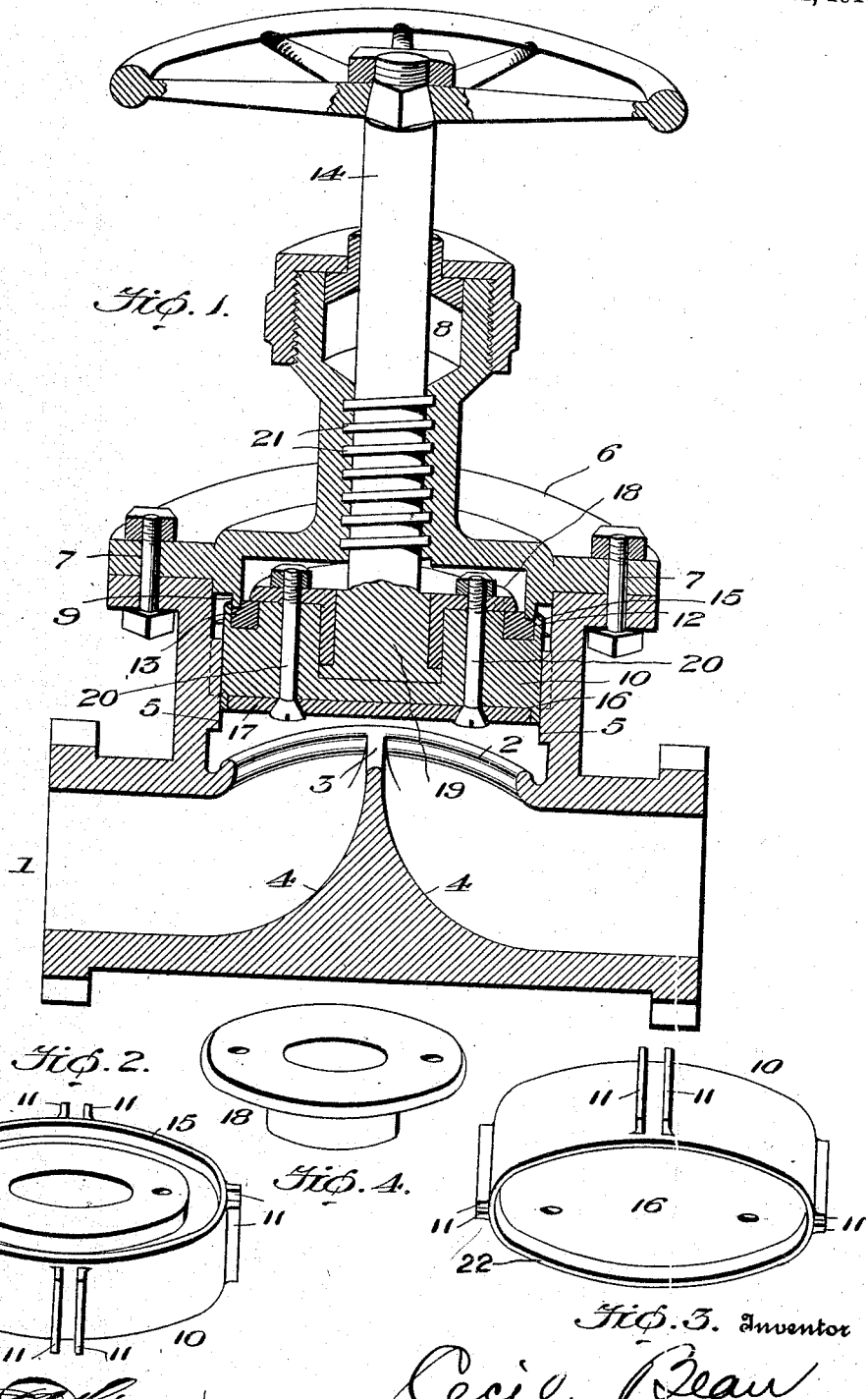

CECIL BEAN, OF LLANO, TEXAS.

RECIPROCATING VALVE.

1,174,959.

Specification of Letters Patent.

Patented Mar. 14, 1916.

Application filed June 3, 1915. Serial No. 31,884.

*To all whom it may concern:*

Be it known that I, CECIL BEAN, a citizen of the United States, residing at Llano, county of Llano, and State of Texas, have invented certain new and useful Improvements in Reciprocating Valves, of which the following is a specification.

This invention relates to reciprocating valves.

My object is the provision of a reciprocating valve of improved construction whose stem can be re-packed at any time when the valve is under pressure of the fluid it controls and when either open or closed; one in which the construction shuts off access of the fluid or water from the screw stem at all times so that corrosion of the threads is prevented; a valve of improved construction whereby either end of the shell or casing can be connected to the supply without interfering with the correct and satisfactory operation of the valve; one whose resistance, as compared with the usual types of globe valve is very small; and a valve whose packing or washers can be readily removed and others substituted therefor.

My improved valve, which is adapted for use with air, gas or liquid, embodies a novel annular and cross seat and sloping parts in the shell or casing leading to said cross seat, whereby the supply may be let into either end of the valve shell or casing.

The invention also consists of a valve of improved construction adapted for removably holding packing on both of its faces and for its swivel connection to the valve stem; further, in a valve carrying packing on its opposite faces and coöperating with a seat on the valve bonnet and also with the fluid control seat, together with guiding means interposed between the valve and the valve body and a swiveled connection between the stem and the valve, whereby the valve is packed or sealed when both open and closed.

The invention is susceptible of modification and the disclosures herein are to be considered as illustrative, rather than restrictive, of the scope of the invention.

One embodiment of the invention is shown in the accompanying drawings, in which—

Figure 1 is a sectional view in perspective; Fig. 2, a top perspective of the valve; Fig. 3, a bottom perspective thereof; and Fig. 4, a top perspective of the gland that swivels the stem.

The valve body 1 has an annular ridge constituting a valve-seat 2 and a cross-piece or seat member 3 whose upper edge or face lies in the same plane with the upper edge or face of the seat 2 and to which the bottom of the body 1 slopes, preferably on a curve at 4, the seat member 3 constituting the ridge or top of the sloping portions 4. By virtue of this construction, either end of the body 1 may be coupled to the supply pipe and consequently care does not have to be taken in coupling up the valve.

The upright portion of the body is provided with guide ribs 5, preferably arranged at ninety degrees apart. The valve bonnet 6 is adapted to be secured to the body by removable bolts 7 and has a stuffing box 8, as usual, but it differs from the usual type of bonnet in that there is provided an annular seat 9 which is spaced apart from the inner face of the valve body where it enters the same and projects downwardly therein.

The valve 10 is provided with projections, ears or lugs 11 which straddle the ribs 5 and snugly yet easily receive them, thus providing for a guiding of the valve in its reciprocations. In the upper face of the valve 10 is an annular packing receiving seat or channel 12 containing a gasket or packing ring 13, against which the seat 9 bears when the valve is completely open, thus shutting off the admission of the fluid to the interior of the bonnet and to the valve stem 14. The annular ridge 15 which results from the employment of the channel 12 surrounds and overlaps the seat 9 when the valve is completely open and thus enhances the sealing action at this point.

The bottom face of the valve 10 has a concavity as at 16 and receives a packing disk or washer 17. A gland 18 bears against the upper face of the valve 10 and overlaps the packing 13 and holds it in the channel 12. The hub of this gland holds the head 19 of the stem 14, thus providing a swivel connection between the stem 14 and the valve 10. Bolts 20 pass through holes in the valve 10 and through the washer 17 and gland 18, thereby constituting a common means for holding the packing on both sides of the valve 10 and for securing the gland 18. By the employment of these two bolts, I accomplish the triple object of securing the two packings and swiveling the stem to the valve.

The valve stem has the usual screw-threads 21.

When the valve is down, the washer or seat 17 bears against the annular seat 2 and the cross-piece 3 and the annular projecting flange 22 overlaps the seat 2 and surrounds it, thus enhancing the sealing action. The pressure of the straight cross-piece against the washer 17 prevents any buckling of the central portion thereof in addition to sealing communication between the inlet and outlet of the valve casing, while the annular seat 2 prevents passage of the fluid upwardly, when the valve is closed. As the valve is of the reciprocating, non-turning, type, the washer 17 may be held down on the seat 2 and cross-piece 3 with any desired pressure, effectually seating the valve without such wearing off of the face of the washer as would result with a valve that turned. When thus closed, the stuffing box nut can be taken off and the packing in said box renewed, without shutting off the fluid pressure. When the valve is open, the packing 13 and the seat 9 prevent the fluid from having access to the valve stem and consequently the packing in the stuffing box 8 may be renewed with the valve open. Whether open or closed, the fluid, whether gas, air or water, is prevented from having access to the screw-threads 21 and they are thus prevented from corroding. On removing the bolts 7, the bonnet and valve and stem can be taken out and the bolts 20 quickly removed to renew the seat 17 or the packing or seat 13.

Having thus described my invention, what I claim as new and desire to secure by Letters Patent, is:

1. In a valve, the combination with a valve body provided with a raised, narrow annular valve-seat, a raised, narrow cross valve-seat disposed in the same plane and duplicate inlet and outlet chambers having corresponding sloping walls leading to said cross valve-seat, of a reciprocatory valve movable toward and away from the annular and cross valve-seats, and a flat washer carried by the face of said valve adapted to bear on both the annular and the cross valve-seats.

2. In a valve, the combination with a body having a valve-seat, and a bonnet having an annular seat, of a valve adapted to play between the seats aforesaid, packing or seats carried by the opposite faces of the valve adapted to engage the valve-seat and bonnet seat, respectively, a valve-stem, a gland for connecting the valve-stem to the valve, said gland being adapted to retain the seat or packing on the outer face of the valve, and fastenings extending through the valve and separate from the valve stem, serving as a common means for connecting the valve-seat packing to the valve and for securing the gland to the valve.

3. In a valve, the combination with a body having a valve-seat, and a bonnet having an annular seat, of a valve adapted to play between the seats aforesaid, packing or seats carried by the opposite faces of the valve adapted to engage the valve-seat and bonnet seat, respectively, guides and ribs interposed between the valve and the body adapted to prevent the valve from turning, a rotary valve-stem, a gland which swivels the valve-stem to the valve, said gland overlapping and being adapted to hold the seat or packing to the outer face of the valve, and bolts passing through the seat or packing on the inner face of the valve and through the gland, whereby said bolts serve the purpose of securing both seats or packings to the valve and of swiveling the stem to the valve.

4. In a valve, the combination with a body having an annular valve-seat and guides, of a bonnet having a depending annular seat, a valve having ribs coöperating with the guides to prevent the valve from rotating, said valve having an annular channel in its outer face and a concavity in its inner face, seats or packing in the channel and concavity, respectively, adapted to engage the bonnet seat and the valve-seat respectively, a valve-stem, a gland overlapping the seat or packing in the channel and holding it in position and also having a hub which swivels the stem to the valve, and bolts passing through the seat or packing in said concavity and through the valve and gland.

CECIL BEAN.

Copies of this patent may be obtained for five cents each, by addressing the "Commissioner of Patents, Washington, D. C."